(12) United States Patent
Shimizu et al.

(10) Patent No.: US 8,791,637 B2
(45) Date of Patent: Jul. 29, 2014

(54) VEHICLE TURN SIGNAL DEVICE

(75) Inventors: Takahiro Shimizu, Aichi (JP); Takao Imai, Aichi (JP); Takashi Ieda, Aichi (JP); Syogo Yamaguchi, Aichi (JP); Kozo Nishimura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 493 days.

(21) Appl. No.: 12/711,880

(22) Filed: Feb. 24, 2010

(65) Prior Publication Data

US 2010/0219051 A1 Sep. 2, 2010

(30) Foreign Application Priority Data

Feb. 27, 2009 (JP) ................................. 2009-047218

(51) Int. Cl.
*B60Q 1/34* (2006.01)
(52) U.S. Cl.
USPC ............................................. 315/81; 315/77
(58) Field of Classification Search
USPC ................. 315/80, 81; 362/36; 340/476, 477; 200/61.27, 61.3
See application file for complete search history.

(56) References Cited

U.S. PATENT DOCUMENTS

| 4,333,071 | A  | * | 6/1982  | Kira et al. ........................ 315/81 |
| 7,150,547 | B2 | * | 12/2006 | Okawa .............................. 315/81 |
| 2001/0014846 | A1 | * | 8/2001  | Sawamoto et al. ............. 701/96 |
| 2003/0156015 | A1 | * | 8/2003  | Winner et al. .............. 340/425.5 |
| 2004/0100373 | A1 | * | 5/2004  | Ponziani ........................ 340/476 |
| 2004/0246119 | A1 | * | 12/2004 | Martin et al. ................. 340/476 |
| 2005/0200467 | A1 | * | 9/2005  | Au et al. ....................... 340/465 |
| 2009/0205936 | A1 |   | 8/2009  | Ueno |

FOREIGN PATENT DOCUMENTS

| JP | 05-319169 | 12/1993 |
| JP | 11-070833 | 3/1999 |
| JP | 2000-108782 | 4/2000 |
| JP | 2001-322489 | 11/2001 |
| JP | 2003-237461 A | 8/2003 |
| JP | 2003-252112 | 9/2003 |
| JP | 2006-321347 A | 11/2006 |
| JP | 2009-248576 A | 10/2009 |

OTHER PUBLICATIONS

Office Action dated May 3, 2012 for Chinese Pat. App. No. 201010127159.1 (4 pages).
English translation of Office Action dated May 3, 2012 for Chinese Pat. App. No. 201010127159.1 (2 pages).

* cited by examiner

*Primary Examiner* — Douglas W Owens
*Assistant Examiner* — Jianzi Chen
(74) *Attorney, Agent, or Firm* — James R. Gourley; Colin P. Cahoon; Carstens & Cahoon, LLP

(57) ABSTRACT

A turn signal device for a vehicle for activating a turn signal in accordance with operation of an operation lever. The turn signal device includes a turning state detection unit, which detects a turning state of the vehicle. The turning state detection unit monitors a temporal change in the turning state of the vehicle after the turn signal is activated. The turning state detection unit deactivates the turning signal when detecting that the vehicle first turns in an activation direction of the turn signal, then turns in a direction opposite to the activation direction, and afterward turns again in the activation direction.

14 Claims, 14 Drawing Sheets

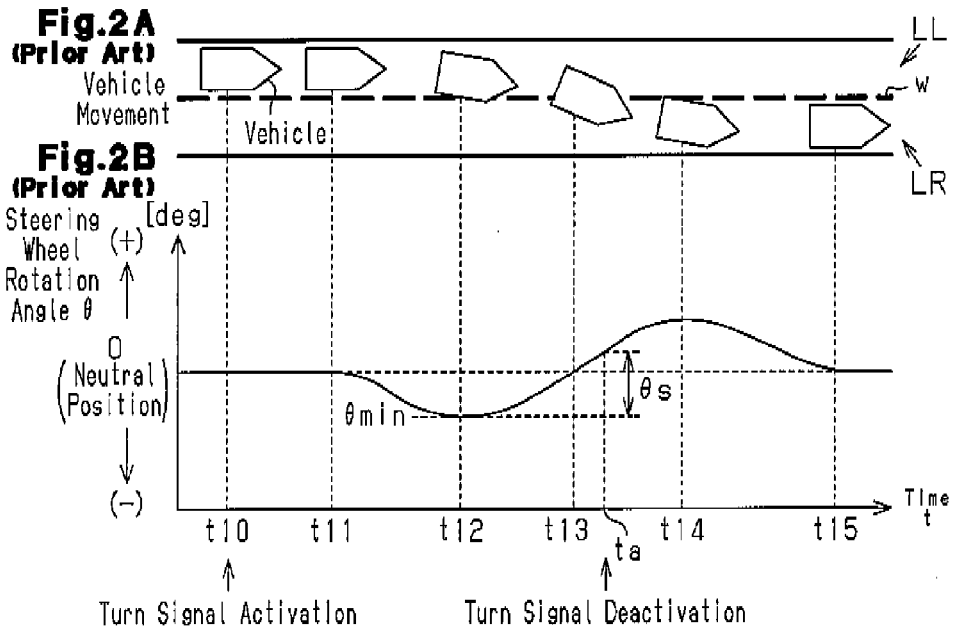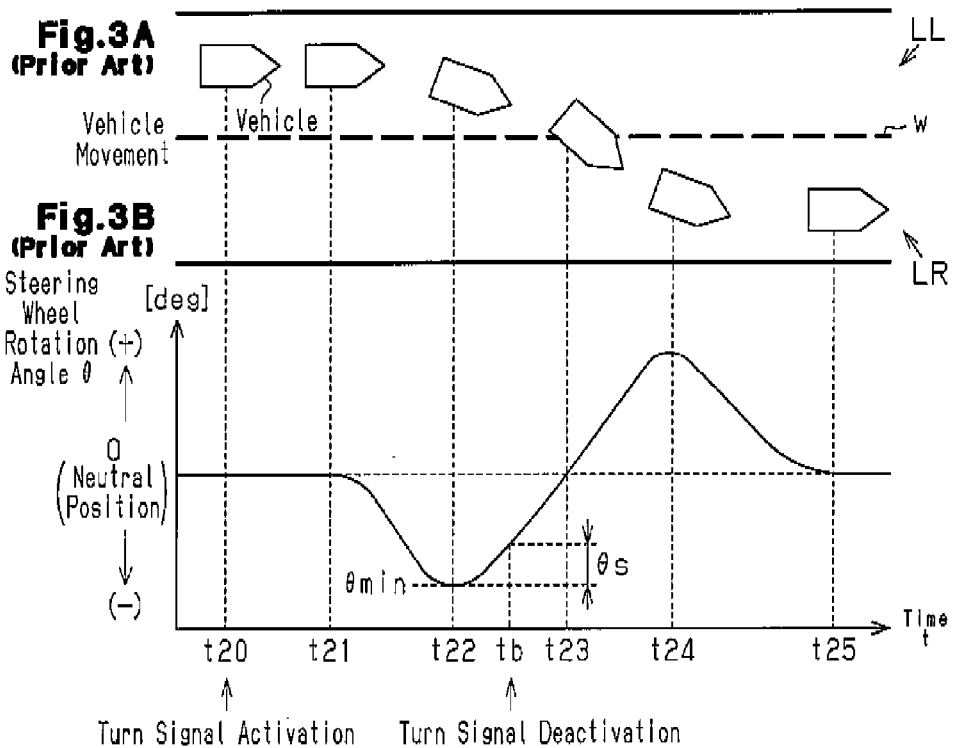

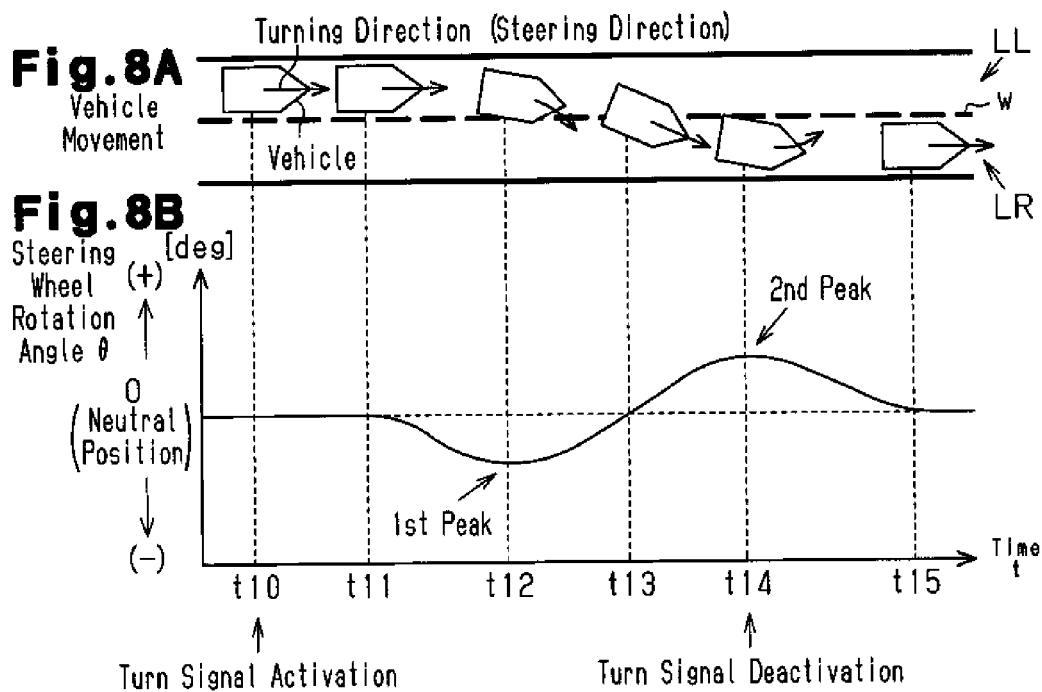
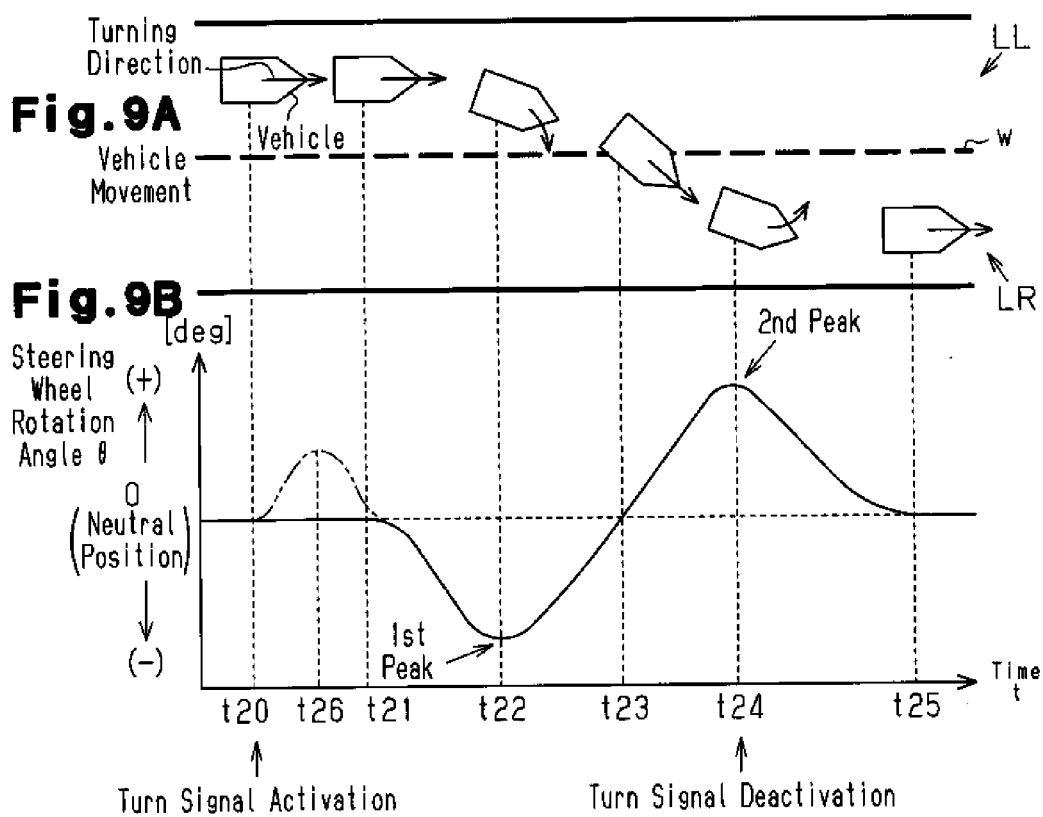

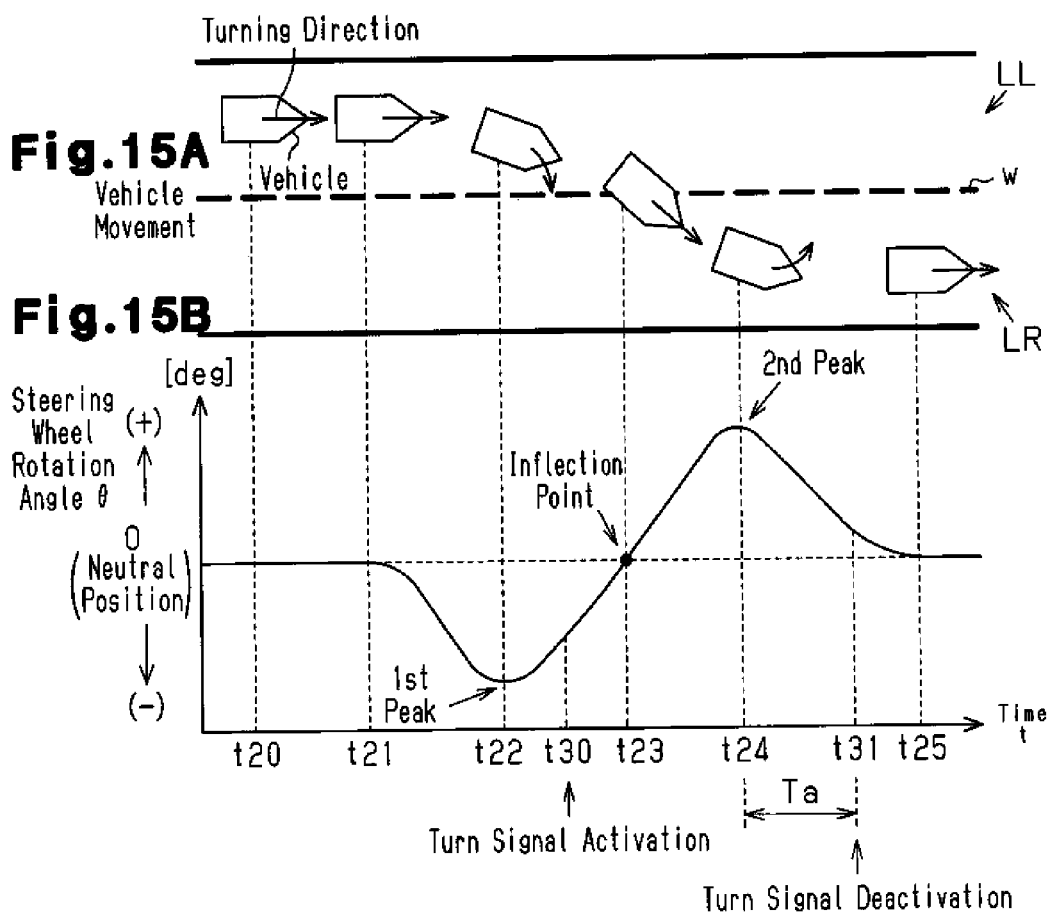

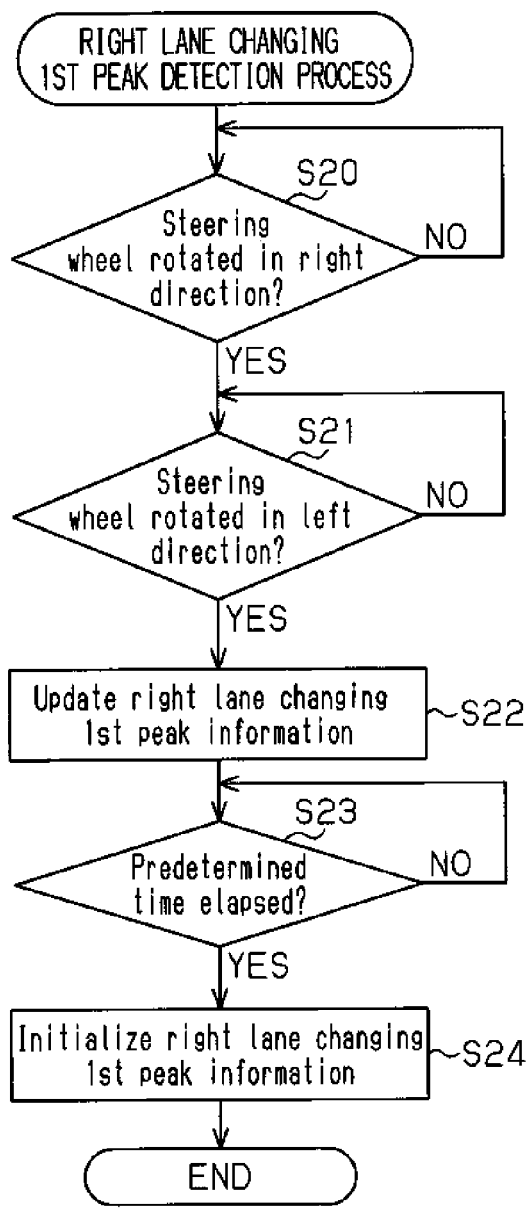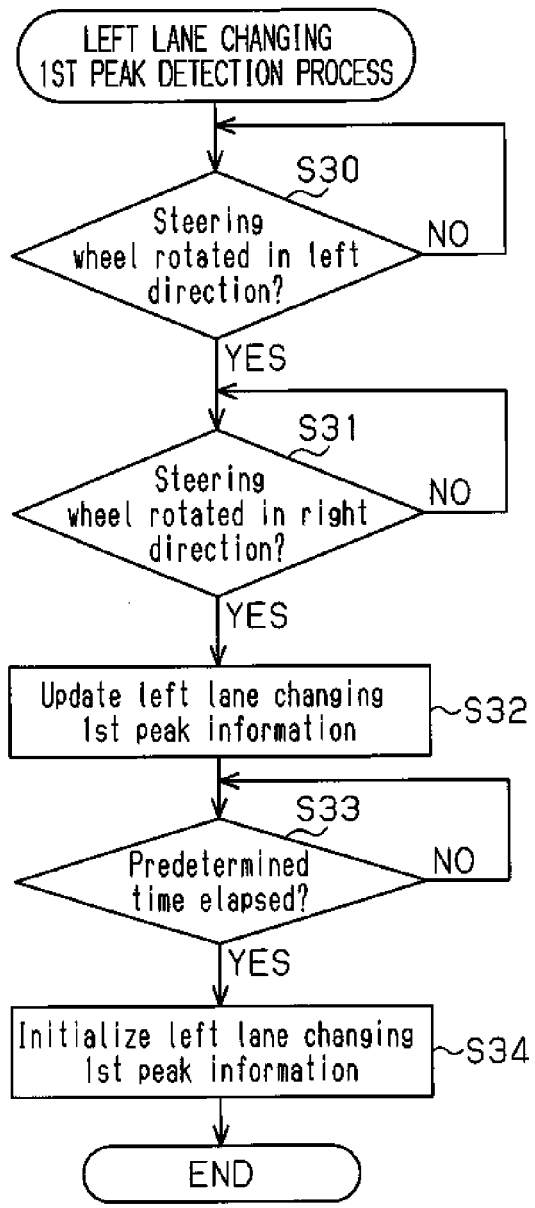

VEHICLE TURN SIGNAL DEVICE

CROSS-REFERENCE TO RELATED APPLICATIONS

This application is based upon and claims the benefit of priority from prior Japanese Patent Application No. 2009-047218, filed on Feb. 27, 2009, the entire contents of which are incorporated herein by reference.

BACKGROUND OF THE INVENTION

The present invention relates to a vehicle turn signal device that activates a turn signal in accordance with the operation of an operation lever, which is arranged in a vehicle, and deactivates the turn signal in accordance with a rotating operation of a steering wheel.

As well known in the art, a vehicle includes a turn signal device for switching a turn signal between an activated state and a deactivated state in accordance with the operation of an operation lever and a steering wheel by a driver. FIG. 1 is a plan view showing an operation lever and steering wheel of a vehicle. A turn signal device generally activates the turn signal (not shown) on the right side or left side of the vehicle when the driver operates an operation lever 11, which is arranged on a steering column 10 of the vehicle. The turn signal device also deactivates the turn signal in accordance with the rotating operation of the steering wheel 12 performed by the driver. Japanese Laid-Open Patent Publication No. 11-70833 describes an example of such a turn signal device.

The turn signal device described in Japanese Laid-Open Patent Publication No. 11-70833 includes a rotation angle sensor for detecting a rotation angle θ from a neutral position of the steering wheel 12. The turn signal is deactivated based on the rotation angle θ detected by the rotation angle sensor. For example, after activating the right turn signal of the vehicle, the driver rotates the steering wheel 12 to the right (operation in the direction indicated by arrow a1 in FIG. 1). The driver then rotates the steering wheel 12 to the left (operation in the direction indicated by arrow a2 in FIG. 1) to return the steering wheel 12 to a neutral position. The turn signal device calculates a returning rotation angle θb when the rotating direction of the steering wheel 12 is reversed based on the rotation angle θ detected by the rotation angle sensor. The turn signal device deactivates the turn signal when the calculated returning rotation angle θb reaches a cancellation return angle θs.

In the prior art turn signal device, the value of the cancellation return angle θs is set to automatically deactivate the turn signal even when a temporal change in the rotation angle θ is extremely small, such as when the driver activates the turn signal to change lanes while driving on a highway. This eliminates the need to manually deactivate the turn signal and significantly improves convenience.

However, in the turn signal device, for example, the size of the vehicle or the width of a road varies the rotation angle θ at which the steering wheel 12 is returned. This slightly varies the timing at which the turn signal is deactivated.

FIGS. 2 and 3 show the rotation angle θ of the steering wheel 12 when it is returned. FIG. 2 shows the movement of the vehicle and temporal changes in the rotation angle θ when the driver changes lanes to a right lane LR from a left lane LL when driving along a narrow road. FIG. 3 shows the movement of the vehicle and temporal changes in the rotation angle θ when the driver changes lanes to a right lane LR from a left lane LL when driving along a wide road. In FIGS. 2B and 3B, the value of the rotation angle θ when the steering wheel 12 is positioned at the neutral position is indicated as "0°". The rotation angle θ changes to a negative value when the steering wheel 12 is rotated to the right and to a positive value when the steering wheel 12 is rotated to the left.

As shown in FIGS. 2A and 2B, when changing lanes along a narrow road, the driver operates the operation lever 11 at time t10 to activate the right turn signal of the vehicle. Then, the driver starts to change lanes at time t11, the vehicle crosses a divider line w at time t13, and the lane change is completed at time t15. In this case, the rotation angle θ decreases after time t11, reaches a minimum value θmin at time t12, and increases after time t12. The prior art turn signal device described in Japanese Laid-Open Patent Publication No. 11-70833 starts to calculate the returning rotation angle θb at time t12 when the rotation angle θ reaches the minimum value θmin. Then, the prior art turn signal device deactivates the turn signal at time ta when the returning rotation angle θb reaches the cancellation return angle θs. Thus, when the width of the road is narrow like in FIG. 2A, the turn signal is deactivated after the vehicle crosses the divider line w, that is, when the vehicle enters the right lane LR.

As shown in FIGS. 3A and 3B, when changing lanes along a wide road, the driver operates the operation lever 11 at time t20 to activate the right turn signal of the vehicle. Then, the driver starts to change lanes at time t21, the vehicle crosses the divider line w at time t23, and the lane change is completed at time t25. Compared to when changing lanes along the narrow road, on the wide road, the rotation angle θ varies more greatly and takes a smaller minimum value θmin. In this case as well, the prior art turn signal device described in Japanese Laid-Open Patent Publication No. 11-70833 starts to calculate the returning rotation angle θb at time t22 when the rotation angle θ reaches the minimum value θmin. Then, the prior art turn signal device deactivates the turn signal at time tb when the returning rotation angle θb reaches the cancellation return angle θs. In this case, however, the turn signal is deactivated before the vehicle crosses the divider line w, that is, before the vehicle enters the right lane LR. This may result in the driver of a following vehicle mistakenly believing that the driver of the preceding vehicle does not intend to change lanes.

Accordingly, there is still room for improvement with the prior art turn signal device with regards to the reliability of the deactivation function of the turn signal.

SUMMARY OF THE INVENTION

One aspect of the present invention is a turn signal device for a vehicle for activating a turn signal in accordance with operation of an operation lever. The turn signal device includes a turning state detection unit which detects a turning state of the vehicle. The turning state detection unit monitors temporal change in the turning state of the vehicle after the turn signal is activated. The turning state detection unit deactivates the turning signal when detecting that the vehicle first turns in an activation direction of the turn signal, then turns in a direction opposite to the activation direction, and afterward turns again in the activation direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 2A and 2B are timing charts showing an operation example of deactivation of a turn signal with the turn signal device of FIG. 1;

FIGS. 3A and 3B are timing charts showing an operation example of deactivation of a turn signal with the turn signal device of FIG. 1;

FIGS. 8A and 8B are timing charts showing an operation example in which the turn signal is deactivated in accordance with the flowchart of FIG. 7;

FIGS. 9A and 9B are timing charts showing an operation example in which the turn signal is deactivated in accordance with the flowchart of FIG. 7;

FIGS. 15A and 15B are timing charts showing an activation-deactivation control executed in a fourth embodiment by the turn signal device of FIG. 4;

FIG. 16A is a flowchart showing a right lane changing first peak detection process performed by the turn signal device of FIG. 4;

FIG. 16B is a flowchart showing a left lane changing first peak detection process performed by the turn signal device of FIG. 4.

DETAILED DESCRIPTION OF THE PREFERRED EMBODIMENTS

The present invention relates to a deactivation function for a turn signal of a vehicle, and, in particular, provides a turn signal device that ensures the reliability of the deactivation function when changing lanes.

First Embodiment

A first embodiment of a vehicle turn signal device according to the present invention will now be discussed with reference to FIGS. 4 to 9. First, the configuration of the turn signal device of the first embodiment will be schematically described with reference to FIGS. 4 and 5.

Figure 1:
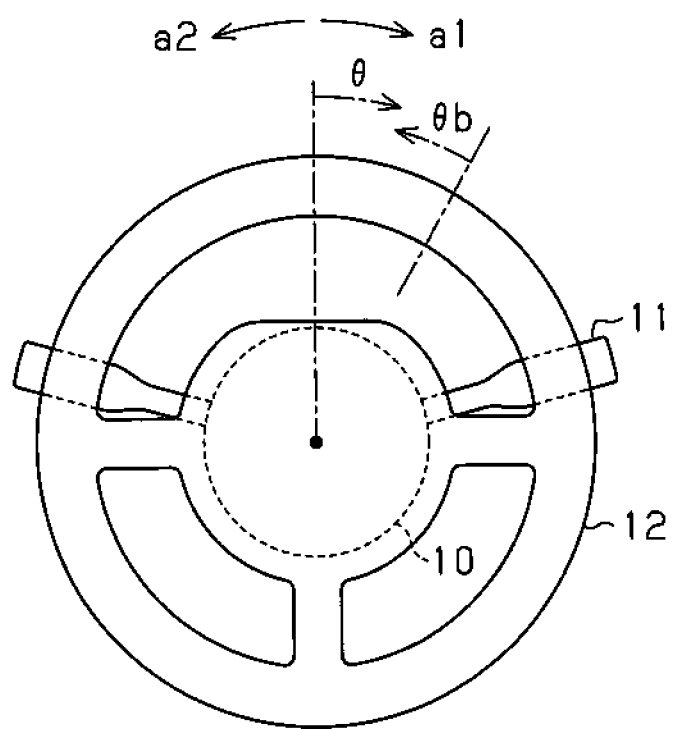
FIG. 1 is a schematic plan view showing a prior art vehicle turn signal device.
Figure 4:
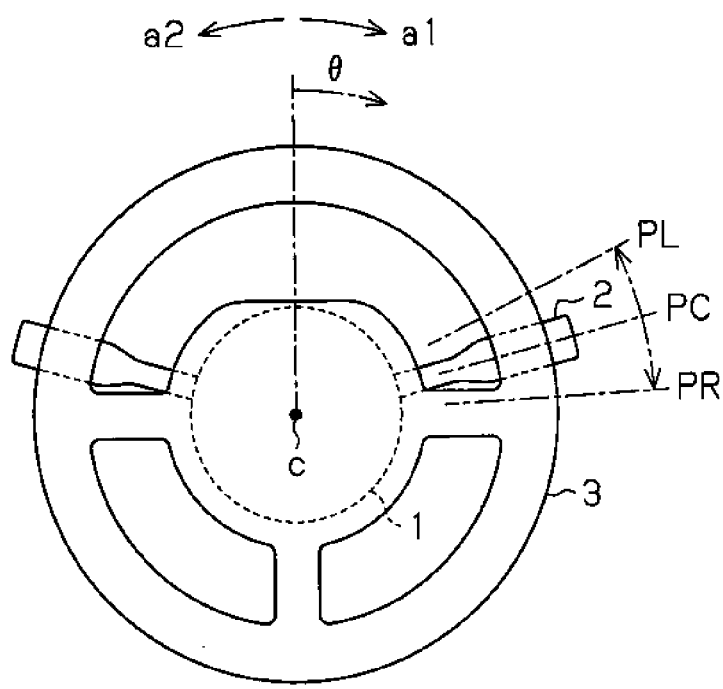
FIG. 4 is a schematic plan view showing a first embodiment of a vehicle turn signal device according to the present invention.
Figure 5:
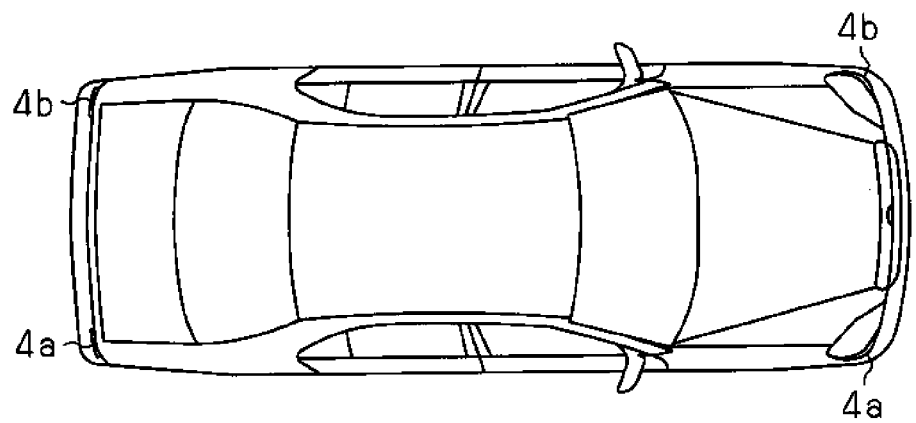
FIG. 5 is a schematic plan view showing the turn signal device of FIG. 4.

As shown in FIG. 4, the turn signal device includes an operation lever 2, which is cantilever-supported by a steering column 1 of the vehicle. The operation lever 2 has a basal end supported by the steering column 1. A driver applies external force to and tilts the operation lever 2 from a neutral position PC, as shown in FIG. 4, to a right operation position PR or a left operation position PL. When the operation lever 2 is tilted to the operation position PR or PL, a turn signal 4a, which is arranged on the right side of the vehicle, or a turn signal 4b, which is arranged on the left side of the vehicle, is activated. The activation includes a flashing state. The operation lever 2 is a so-called momentary type that automatically returns to the neutral position PC from its tilted operation position PR or PL when external force is removed. As shown in FIG. 4, the turn signal device also deactivates the turn signal 4a or 4b from an activated state in accordance with the rotation of the steering wheel 3 by the driver. The driver applies external force to the steering wheel 3 to rotate the steering wheel 3 about a center axis c from the neutral position shown in FIG. 41 toward the right (direction indicated by arrow a1 in FIG. 4) or toward the left (direction indicated by arrow a2 in FIG. 4).

Figure 6:
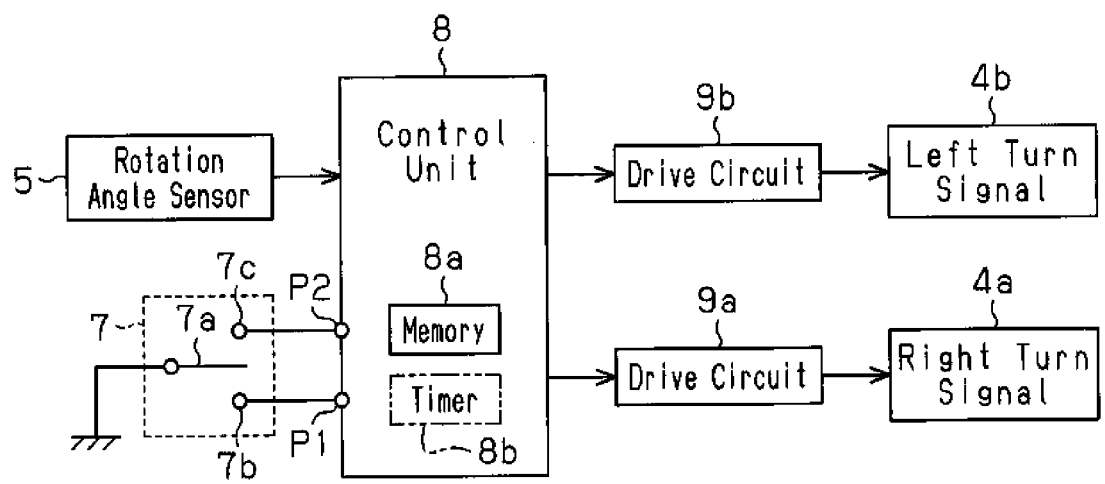
FIG. 6 is a block diagram showing the system configuration of the turn signal device of FIG. 4.

FIG. 6 is a block diagram showing the system configuration of the turn signal device. The configuration and operation of the turn signal device will be described in further detail referring to FIG. 6.

As shown in FIG. 6, the turn signal device includes a rotation angle sensor 5, which detects the rotation angle θ of the steering wheel 3 from the neutral position, and a turn signal switch 7, which is activated and deactivated in cooperation with the tilting of the operation lever 2. The rotation angle sensor 5 is one example of a rotation angle detection unit. The turn signal switch 7 is in a deactivated state when the operation lever 2 is located at a neutral position PC. In the deactivated state, a movable contact 7a is not connected to either one of fixed contacts 7b and 7c, as shown in FIG. 6. The turn signal switch 7 is in an activated state when the operation lever 2 is tilted to a right operation position PR thereby connecting the movable contact 7a, which has a ground potential, to the fixed contact 7b. The turn signal switch 7 is also in an activated state when the operation lever 2 is tilted to the left operation position PL thereby connecting the movable contact 7a, which has a ground potential, to the fixed contact 7c.

The output signal of the rotation angle sensor 5 and the output signal of the turn signal switch 7 are provided to a control unit 8. The control unit 8 includes a microcomputer and centrally controls the activation and deactivation of the turn signals 4a and 4b. The control unit 8 includes a memory 8a, which stores information on the rotation angle θ of the steering wheel 3 that has been sequentially detected by the rotation angle sensor 5 up until a predetermined period before the present time. The control unit 8 thus constantly recognizes the rotation direction of the steering wheel 3 based on the information on the rotation angle θ stored in the memory 8a. For instance, when the rotation angle sensor 5 detects a present rotation angle $\theta_n$, the control unit 8 reads a rotation angle $\theta_{n-1}$, which has just been detected by the rotation angle sensor 5, from the memory 8a. The control unit 8 then subtracts the previous rotation angle $\theta_{n-1}$ from the present rotation angle $\theta_n$ to calculate a difference value. Further, the control unit 8 determines whether the steering wheel 3 is being rotated in the right direction or in the left direction based on whether the difference value is a positive value or a negative value.

The control unit 8 includes terminals P1 and P2, which are respectively connected to the fixed contacts 7b and 7c of the turn signal switch 7, and monitors the potential at the terminals P1 and P2. The control unit 8 determines that the movable contact 7a is connected to the fixed contact 7b, that is, the operation lever 2 is tilted to the right operation position PR, when detecting that the potential of the terminal P1 is the ground potential. As a result, the control unit 8 activates the turn signal 4a on the right side of the vehicle with a drive circuit 9a. The control unit 8 determines that the movable contact 7a is connected to the fixed contact 7c, that is, the operation lever 2 is tilted to the left operation position PL, when detecting that the potential of the terminal P2 is the ground potential. As a result, the control unit 8 activates the turn signal 4b on the left side of the vehicle with a drive circuit 9b.

Further, the control unit 8 monitors the temporal changes in the rotation direction of the steering wheel 3 when activating the turn signal 4a or 4b. The control unit 8 deactivates the turn signal 4a or 4b with the drive circuit 9a or 9b based on a change in the rotation direction. The control unit 8 indirectly monitors temporal changes in the turning state (steering state) of the vehicle by monitoring temporal changes in the rotation direction of the steering wheel 3. A turning state detection unit is formed, for example, by the control unit 8 and the rotation angle sensor 5 (rotation angle detection unit) but is not limited to such a configuration.

Figure 7:
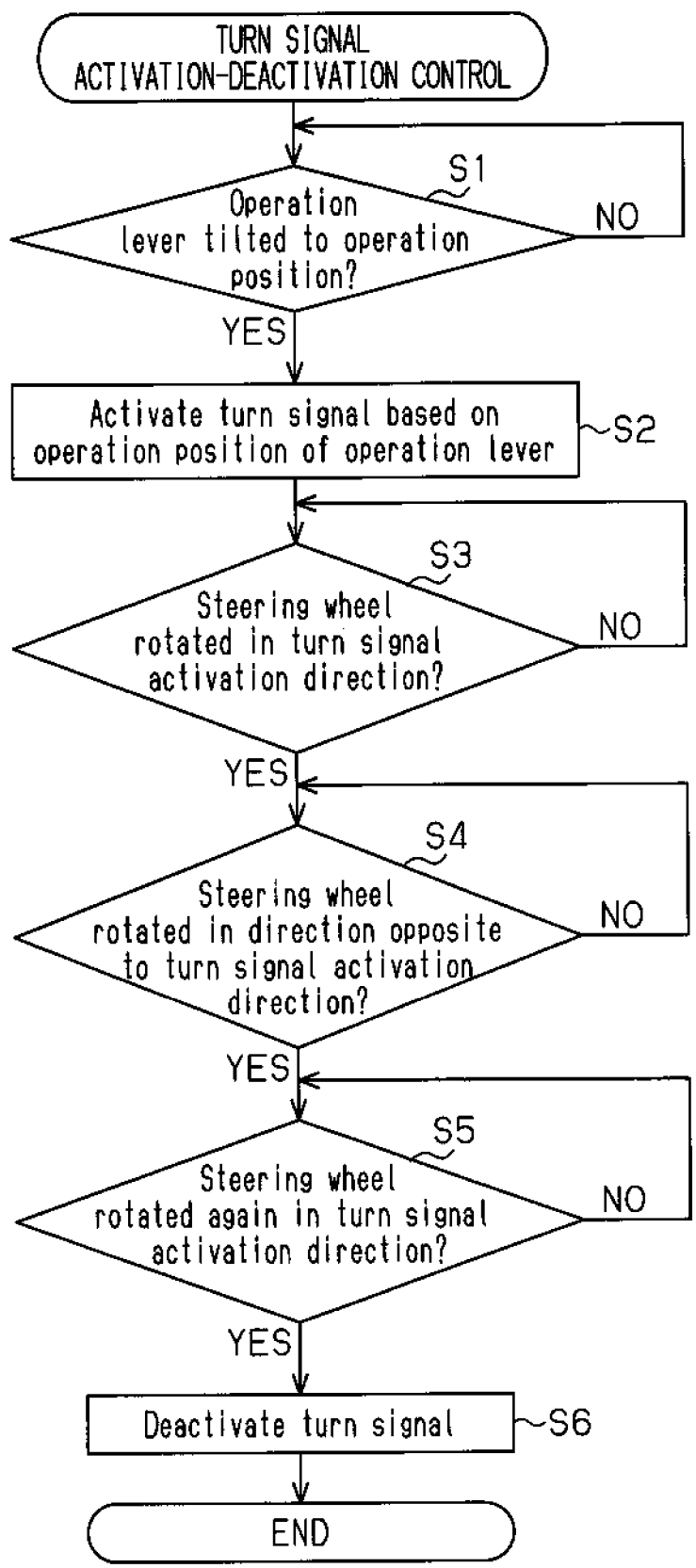
FIG. 7 is a flowchart showing an activation-deactivation control executed in the first embodiment by the turn signal device of FIG. 4.

FIG. 7 is a flowchart showing an activation-deactivation control of the turn signals 4a and 4b executed by the control unit 8. The control unit 8 repeatedly executes the process shown in FIG. 7 in predetermined computation cycles.

As shown in FIG. 7, the control unit 8 first determines whether or not the operation lever 2 is tilted to the right operation position PR or the left operation position PL (step S1). In the first embodiment, the control unit 8 determines that the operation lever 2 is tilted to the right operation position PR or the left operation position PL when the potential at the terminal P1 or the terminal P2 is the ground potential. When the operation lever 2 is tilted to the right operation position PR or the left operation position PL (step S1: YES), the control unit 8 activates the turn signal 4a or the turn signal 4b based on the operation position of the operation lever 2 (step S2). The turn signal that is activated corresponds to the one of the terminals P1 and P2 having the ground potential.

Subsequent to step S2, to detect whether the driver has started to change lanes, the control unit 8 determines whether or not the steering wheel 3 has been rotated in the turn signal activation direction (step S3). For instance, when the turn signal 4a on the right side of the vehicle is activated, the rightward rotation direction of the steering wheel 3 is the activation direction of the turn signal 4a, and the control unit 8 determines whether or not the steering wheel 3 has been rotated in the right rotation direction.

When the steering wheel 3 has been rotated in the activation direction of the turn signal (step S3: YES), the control unit 8 determines whether or not the steering wheel 3 has been rotated in the direction opposite to the activation direction to detect reversal of the steering wheel 3 (step S4). For instance, when the turn signal 4a on the right side of the vehicle is activated, the control unit 8 determines whether or not the steering wheel 3 has been rotated in the left rotation direction, which is the direction opposite to the activation direction of the turn signal 4a.

When the steering wheel 3 is rotated in the direction opposite to the activation direction of the turn signal (step S4: YES), to detect another reversal of the steering wheel 3, the control unit 8 determines whether or not the steering wheel 3 has been rotated again in the activation direction of the turn signal (step S5).

When the steering wheel 3 has been rotated again in the activation direction of the turn signal (step S5: YES), the control unit 8 deactivates the turn signal (step S6), and terminates the series of processes.

FIGS. 8 and 9 each show an example of the deactivation operation of the turn signal in accordance with the flowchart of FIG. 7. FIG. 8 shows the movement of the vehicle and temporal changes in the rotation angle θ of the steering wheel 3 when the driver changes lanes from a left lane LL to a right lane LR along a narrow road. FIG. 9 shows the movement of the vehicle and temporal changes in the rotation angle θ of the steering wheel 3 when the driver changes lanes from a left lane LL to a right lane LR along a wide road. In FIGS. 8A and 9A, the turning direction (steering direction) of the vehicle is indicated by arrows. In FIGS. 8B and 9B, the value of the rotation angle θ when the steering wheel 3 is positioned at the neutral position is indicated as "0°". The rotation angle θ changes to a negative value when the steering wheel 3 is rotated to the right and changes to a positive value when the steering wheel is rotated to the left.

As shown in FIG. 8A, when changing lanes along the narrow road, the driver operates the operation lever 2 at time t10 to activate the turn signal 4a on the right side of the vehicle. The driver starts to change lanes to the right lane LR at time t11, the vehicle crosses a divider line w at time t13, and the lane change is completed at time t15.

In this case, the vehicle starts to turn in the right direction of the vehicle from time t11 and is turned the most in the right direction of the vehicle at time t12. Then, the vehicle starts to turn in the left direction of the vehicle from time t12 and is turned the most in the left direction of the vehicle at time t14. Afterwards, the vehicle turns again in the right direction of the vehicle from time t14 and is entering the right lane LR at time t14.

The turn signal device according to the first embodiment operates in the following manner in relation with such movement of the vehicle. First, as shown in FIG. 8B, the control unit 8 detects that the steering wheel 3 rotated in the activation direction of the turn signal 4a at time t11, which is when the value of the rotation angle θ of the steering wheel 3 starts to decrease. The control unit 8 monitors changes in the rotation direction of the steering wheel 3 and determines that the steering wheel 3 has been rotated in the direction opposite to the activation direction of the turn signal 4a at time t12, which is when the rotation angle θ of the steering wheel 3 has reached a first peak (minimum value). Then, the control unit 8 determines that the steering wheel 3 has been rotated again in the activation direction of the turn signal 4a at time t14, which is when the rotation angle θ of the steering wheel 3 has reached a second peak (maximum value), and deactivates the turn signal 4a on the right side of the vehicle at time t14. Thus, the turn signal 4a on the right side of the vehicle is deactivated when the vehicle is entering the right lane LR.

As shown in FIG. 9A, the driver operates the operation lever 2 at time t20 to activate the turn signal 4a on the right side of the vehicle to change lanes along a wide road. The driver starts to change lanes to the right lane LR at time t21, the vehicle crosses a divider line w at time t23, and the lane change is completed at time t25.

In this case, the vehicle starts to turn in the right direction of the vehicle from time t21 and is turned the most in the right direction of the vehicle at time t22. The vehicle starts to turn in the left direction of the vehicle from time t22 and is turned the most in the left direction of the vehicle at time t24. The vehicle again turns in the right direction of the vehicle from time t24 and is entering the right lane LR at time t24.

As shown in FIG. 9B, changes in the rotation angle θ of the steering wheel 3 is greater than when changing lanes in a narrow road. However, the behavior of the changes is substantially the same. Thus, the control unit 8 determines that the steering wheel 3 has been rotated again in the activation direction of the turn signal 4a at time t24, which is when the rotation angle θ of the steering wheel 3 has reached a second peak (maximum value), and deactivates the turn signal 4a on the right side of the vehicle at time t24. In other words, the turn signal 4a on the right side of the vehicle is deactivated when the vehicle is entering the right lane LR even along a wide road.

Accordingly, the turn signal device deactivates the turn signal when the vehicle is entering a different lane regardless of whether the road is wide or narrow. This ensures the reliability of the deactivation function of the turn signal.

The turn signal device of the first embodiment has the advantages described below.

(1) The vehicle is normally turned (steered) in the following manner when the driver changes lanes after activating the turn signal 4a or 4b. The vehicle first turns in the activation direction of the turn signal 4a or 4b, then turns in the direction opposite to the activation direction, and finally turns again in the activation direction of the turn signal. The inventors of the present invention have found that a vehicle is entering a different lane when the vehicle turns again in the activation direction of the turn signal regardless of whether the vehicle changes lanes along a wide road or a narrow road. Based on this standpoint, the turn signal device monitors changes in the rotation direction of the steering wheel 3 after activating the turn signal 4a or 4b. During a lane change, the rotation direction of the steering wheel 3 first changes in the activation direction of the turn signal 4a or 4b, then changes in the opposite direction, and finally changes again changes in the activation direction. The changes in the rotation direction of the steering wheel 3 are in correspondence with the vehicle first being turned in the activation direction of the turn signal 4a or 4b, then being turned in the opposite direction, and finally being turned again in the activation direction. When detecting these vehicle turning states, the turn signal device deactivates the turn signal 4a or 4b. The turn signal 4a or 4b is thus deactivated when the vehicle is entering a different lane regardless of whether the road is wide or narrow. This ensures the reliability of the deactivation function of the turn signals 4a and 4b.

(2) The turn signal device detects temporal changes in the turning state of the vehicle by detecting temporal changes in the rotation angle θ of the steering wheel 3 detected by the rotation angle sensor 5. Therefore, the turn signal device easily detects temporal changes in the turning state of the vehicle.

Second Embodiment

A second embodiment of a vehicle turn signal device according to the present invention will now be discussed with reference to FIGS. 10 and 11. The basic structure of the turn signal device of the second embodiment is in accordance with the structure described above and shown in FIGS. 4 to 6.

In the second embodiment, the control unit 8 deactivates the turn signal 4a or 4b after a predetermined time has elapsed from when the steering wheel 3 has been rotated again in the activation direction of the turn signal 4a or 4b, that is, from when the rotation angle θ of the steering wheel 3 reaches the second peak. Therefore, the second embodiment also deactivates the turn signal 4a or 4b when the lane change of the vehicle is completed.

In the second embodiment, for example, a timer 8b, which serves as a timer circuit, is arranged in the control unit 8, as shown in FIG. 6. The timer 8b measures the elapsed time from when the rotation angle θ of the steering wheel 3 reaches the second peak, that is, from when the steering wheel 3 is rotated again in the activation direction of the turn signal 4a or 4b. The control unit 8 deactivates the turn signal 4a or 4b with the corresponding drive circuit 9a and 9b when the elapsed time measured by the timer 8b reaches a predetermined time Ta.

Figure 10:
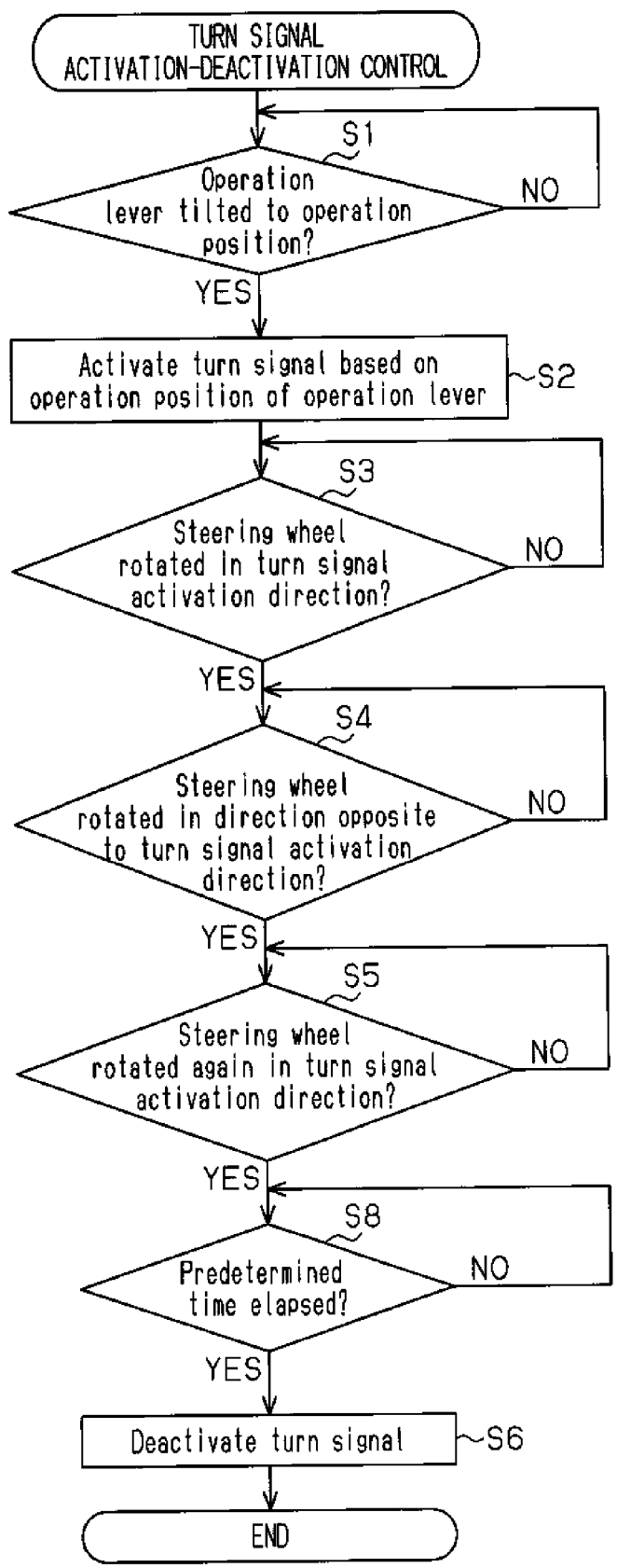
FIG. 10 is a flowchart showing an activation-deactivation control executed in a second embodiment by the turn signal device of FIG. 4.

FIG. 10 is a flowchart showing the activation-deactivation control of the turn signals 4a and 4b executed by the control unit 8. In this flowchart, step S8 is added to the flowchart of FIG. 7.

As shown in FIG. 10, when the steering wheel 3 is rotated again in the activation direction of the turn signal (step S5: YES), the control unit 8 determines whether or not the predetermined time Ta has elapsed from when the steering wheel 3 is rotated again in the activation direction of the turn signal (step S8). That is, the control unit 8 determines whether or not the elapsed time measured by the timer 8b reaches the predetermined time Ta. When the predetermined time Ta has elapsed (step S8: YES), the control unit 8 deactivates the turn signal (step S6) and terminates the series of processes.

Figure 11:
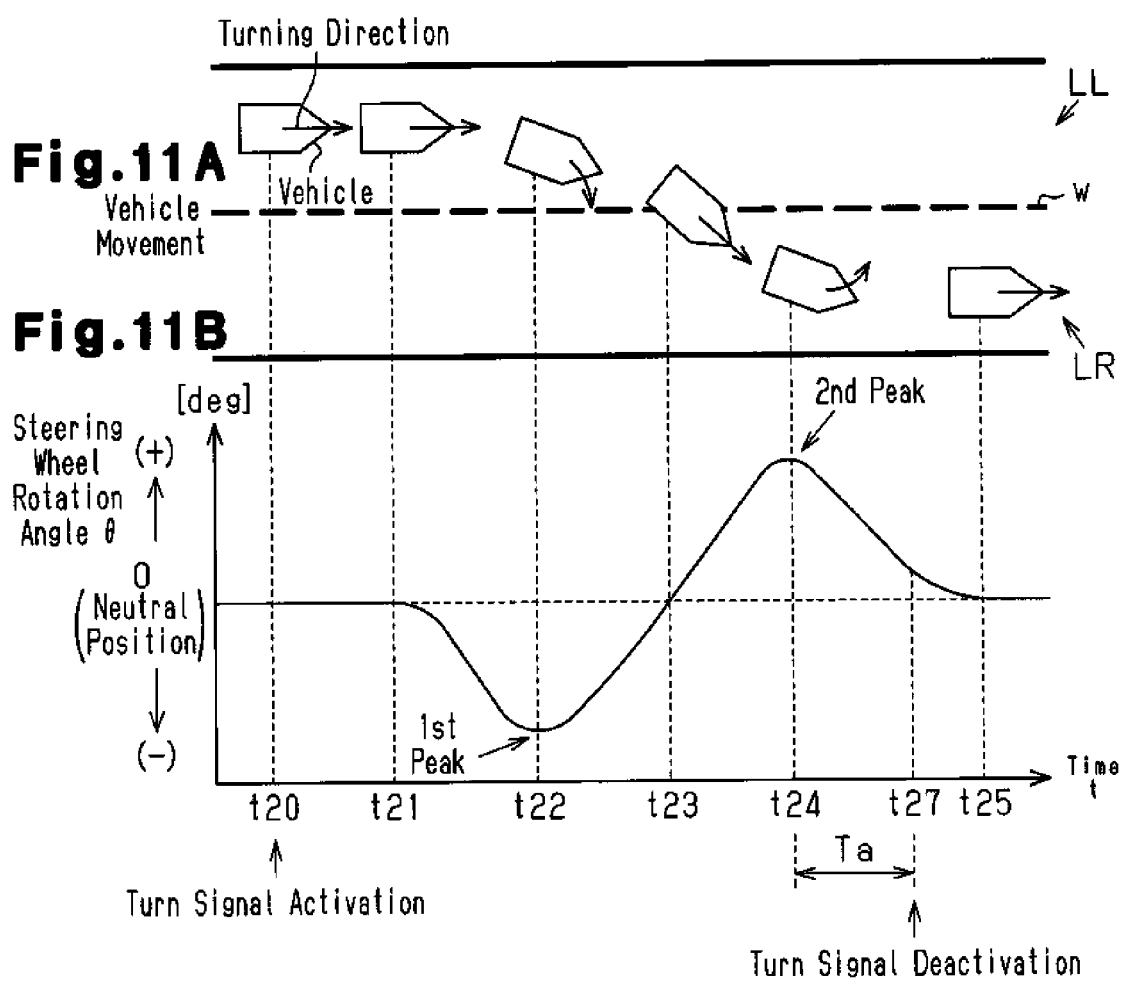
FIGS. 11A and 11B are timing charts showing an operation example in which the turn signal is deactivated in accordance with the flowchart of FIG. 10.

FIG. 11 shows one example of the deactivation operation of the turn signal that is in accordance with the flowchart of FIG. 10. FIG. 11 shows the movement of the vehicle and temporal changes in the rotation angle θ of the steering wheel 3 when the driver changes lanes from a left lane LL to a right lane LR along a wide road. The turning direction of the vehicle is indicated by arrows in FIG. 11.

In FIG. 11B, time t27 indicates when the predetermined time Ta has elapsed from time t24, which is when the rotation angle θ of the steering wheel 3 has reached the second peak. The turn signal device of the second embodiment deactivates the turn signal 4a on the right side of the vehicle at time t27. In other words, as shown in FIG. 11A, the turn signal 4a on the right side of the vehicle is deactivated when the predetermined time Ta has elapsed from time t24, which is when the vehicles starts to turn again in the right direction of the vehicle after being turned the most in the left direction of the vehicle. Thus, the turn signal 4a on the right side of the vehicle is deactivated when the vehicle is entering the right lane LR and substantially completes changing lanes, and the turn signal 4a is deactivated in a further desirable manner.

The turn signal device of the second embodiment has advantage (3) in addition to advantage (2) of the first embodiment.

(3) The timer 8b measures the elapsed time from when the steering wheel 3 is rotated again in the activation direction of the turn signal 4a or 4b, that is, from when the vehicle is turned again in the activation direction of the turn signal 4a or 4b. The control unit 8 determines that the lane change of the vehicle is substantially completed when the elapsed time measured by the timer 8b reaches the predetermined time Ta, and then deactivates the turn signal 4a or 4b. The turn signal 4a or 4b is thus deactivated in a further desirable manner. This improves the reliability of the deactivation function of the turn signal 4a or 4b.

Modification

Figure 12:
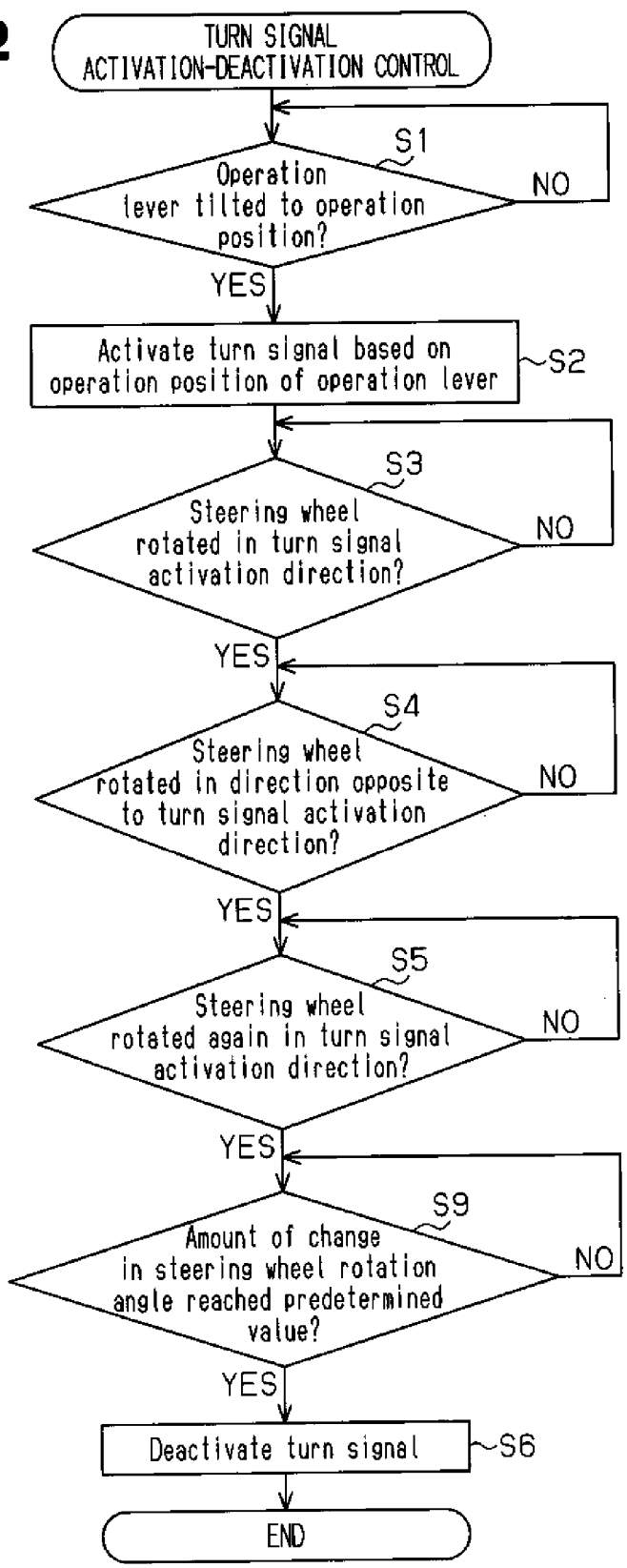
FIG. 12 is a flowchart showing a modification of an activation-deactivation control of the second embodiment executed by the turn signal device of FIG. 4.

FIG. 12 is a flowchart showing a modification of the activation-deactivation control of the second embodiment.

Figure 13:
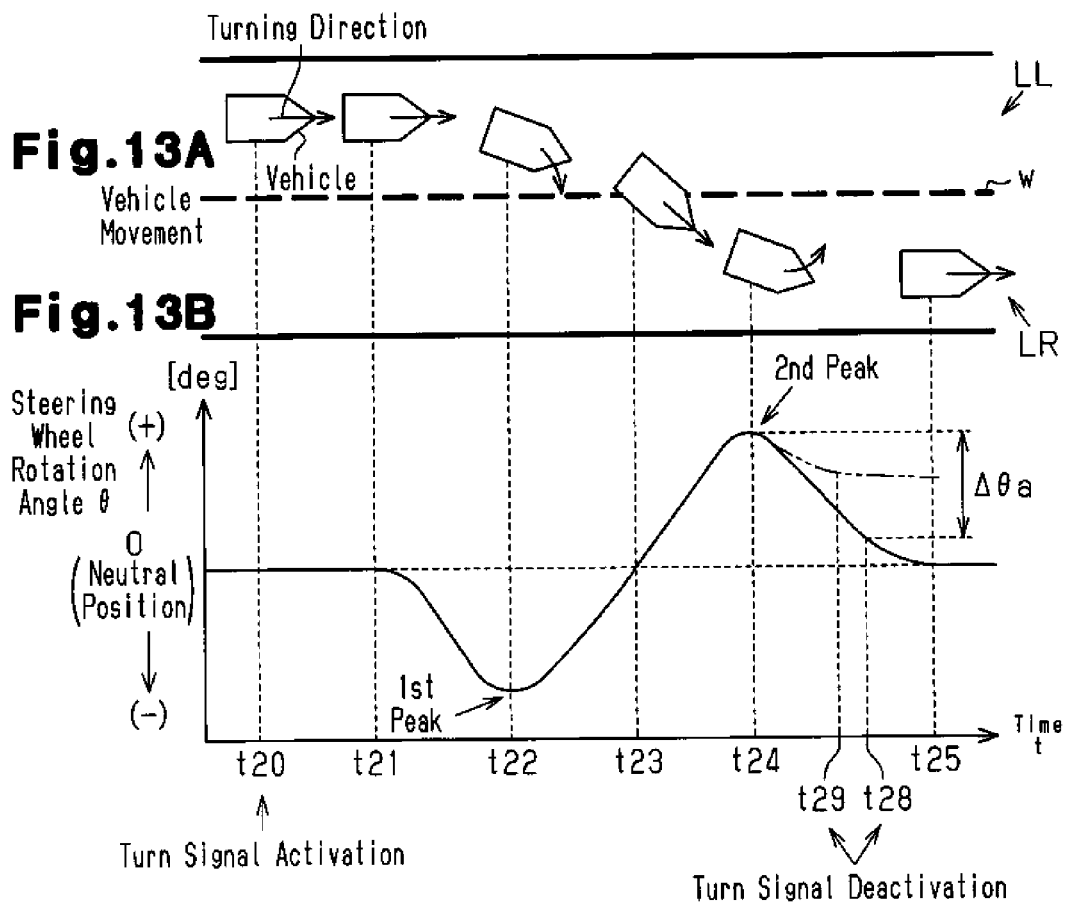
FIGS. 13A and 13B are timing charts showing an operation example in which the turn signal is deactivated in accordance with the flowchart of FIG. 12.

As shown in FIG. 12, in this modification, instead of executing step S8 of FIG. 10, the control unit 8 determines whether or not the amount of change in the rotation angle θ of the steering wheel 3 has reached a predetermined value Δθa (step S9). Specifically, the control unit 8 calculates an amount of change in the rotation angle θ from when the steering wheel 3 rotated again in the activation direction of the turn signal 4a based on the rotation angle θ detected by the rotation angle sensor 5. When the amount of change in the rotation angle θ has reached the predetermined value Δθa (step S9: YES), the control unit 8 deactivates the turn signal 4a (step S6), and terminates the series of processes. Therefore, as shown in FIG. 13, the turn signal 4a on the right side of the vehicle is deactivated at time t28, which is when the amount of change in the rotation angle θ from the second peak reaches the predetermined value Δθa. In other words, the turn signal 4a on the right side of the vehicle is deactivated when the amount of change in the turning of the vehicle from time t24 reaches the predetermined amount. Therefore, the turn signal 4a on the right side of the vehicle is deactivated when the vehicle is entering the right lane LR and substantially completes lane changing. Thus, the same advantages as the second embodiment are obtained. In this modification, the rotation angle sensor 5 functions as a turning amount detection unit for detecting the turning amount of the vehicle.

Third Embodiment

A third embodiment of a vehicle turn signal device according to the present invention will now be discussed with reference to FIGS. 13 and 14. The basic structure of the turn signal device of the third embodiment is in accordance with the structure described above and shown in FIGS. 4 to 6.

The modification of the second embodiment described above has the shortcomings described below. As indicated by the double-dashed line in FIG. 13, when the driver changes lanes while driving along a curve, the steering wheel 3 may be held in a state rotated by a predetermined angle from the neutral position when lane changing is completed at time t29. This may result in the occurrence of a state in which the amount of change in the rotation angle of the steering wheel 3 (amount of change in the turning of the vehicle) does not reach the predetermined value Δθa. In such a case, the turn signal 4a may not be deactivated when the vehicle completes lane changing.

To resolve this problem, in the third embodiment, the control unit 8 calculates the rotation speed ω of the steering wheel 3 (i.e., turning speed of the vehicle) based on the present rotation angle θ of the steering wheel 3 detected by the rotation angle sensor 5 and the rotation angle θ detected a predetermined period before the present time and stored in the memory 8a. When the rotation speed ω of the steering wheel 3 becomes less than or equal to a predetermined speed ωa during a period from when the rotation angle θ reaches the second peak, that is, from when the steering wheel 3 is rotated again in the activation direction of the turn signal 4a or 4b to when the amount of change in the rotation angle θ reaches the predetermined value Δθa, the control unit 8 deactivates the turn signal 4a or 4b. In the third embodiment, the rotation angle sensor 5 further functions as a turning speed detection unit for detecting the turning speed of the vehicle.

Figure 14:
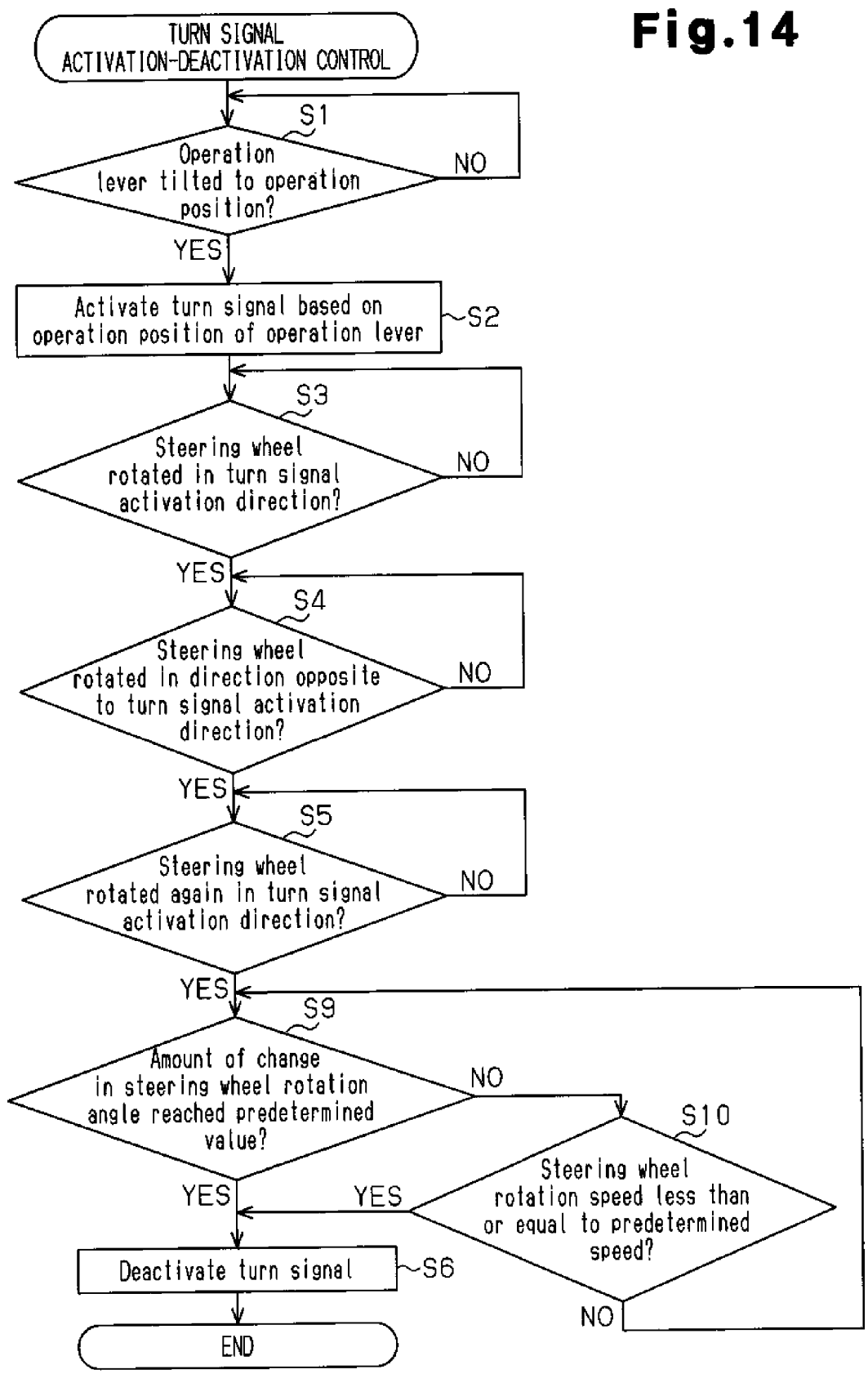
FIG. 14 is a flowchart showing an activation-deactivation control executed in a third embodiment by the turn signal device of FIG. 4.

FIG. 14 is a flowchart showing the activation-deactivation control of the turn signals 4a and 4b executed by the control unit 8. In this flowchart, step S10 is added to the flowchart of FIG. 12. The processes shown in FIG. 14 are repeatedly executed by the control unit 8 in predetermined computation cycles.

As shown in FIG. 14, when the amount of change in the rotation angle θ of the steering wheel 3 has not yet reached the predetermined value Δθa (step S9: NO), the control unit 8 determines whether or not the rotation speed ω of the steering wheel 3 is less than or equal to the predetermined speed ωa (step S10). If the rotation speed ω of the steering wheel 3 is less than or equal to the predetermined speed ωa (step S10: YES), the control unit 8 deactivates the turn signal 4a or 4b (step S6) and terminates the series of processes.

In the third embodiment, the turn signal 4a on the right side of the vehicle is deactivated at time t29, which is when the vehicle completes lane changing and the rotation speed ω of the steering wheel 3 becomes less than or equal to the predetermined speed ωa, as shown by the double-dashed line in FIG. 13B. Therefore, even when the driver changes lanes while driving along a curve, the turn signal 4a on the right side of the vehicle is deactivated when the vehicle substantially completes lane changing. Thus, the turn signal 4a is appropriately deactivated.

The turn signal device of the third embodiment has the advantages described below in addition to advantage (2) of the first embodiment and advantage (3) of the second embodiment.

(4) The control unit 8 calculates the rotation speed ω of the steering wheel 3 based on the rotation angle θ detected by the rotation angle sensor 5. When the rotation speed ω of the steering wheel 3 becomes less than or equal to a predetermined speed ωa during the period from when the steering wheel 3 is rotated again in the activation direction of the turn signal 4a or 4b to when the amount of change in the rotation angle θ reaches the predetermined value Δθa, the control unit 8 deactivates the turn signal 4a or 4b. In other words, the turn signal 4a or 4b is deactivated when the turning speed of the vehicle becomes less than or equal to a predetermined speed. Thus, even when the driver changes lanes while driving along a curve, the control unit 8 determines whether or not the vehicle has completed lane changing in an ensured manner.

Fourth Embodiment

A fourth embodiment of a vehicle turn signal device according to the present invention will now be discussed with reference to FIGS. 15 to 17. The basic structure of the turn signal device of the fourth embodiment is in accordance with the structure described above and shown in FIGS. 4 to 6.

When the driver changes lanes from the left lane LL to the right lane LR as shown in FIG. 15, the driver may activate the turn signal 4a on the right side of the vehicle after the rotation angle θ of the steering wheel 3 reaches the first peak, that is, at time t30, which is after the vehicle starts to turn towards the left. This may result in the shortcoming described below. When changes in the rotation direction of the steering wheel 3 are monitored after the turn signal 4a is activated, changes in the rotation direction of the steering wheel 3 prior to activation of the turn signal 4a are not detected. In other words, the series of changes that occur when the steering wheel 3 is rotated to the right and then to the left are not detected. Thus, the turn signal 4a may not be deactivated when the steering wheel 3 is rotated again to the right after the turn signal is activated, that is, when the vehicle is entering the right lane LR. This problem may also occur when the driver changes lanes from the right lane LR to the left lane LL.

To resolve this problem, in the fourth embodiment, under a situation in which the driver changes lanes from the left lane LL to the right lane LR, a right lane changing first peak detection process is executed to constantly monitor the first peak of the rotation angle θ of the steering wheel 3. In the same manner, under a situation in which the driver changes lanes from the right lane LR to the left lane LL, a left lane changing first peak detection process is executed to constantly monitor the first peak of the rotation angle θ of the steering wheel 3.

FIGS. 16A and 16B are flowcharts showing the right lane changing first peak detection process and the left lane changing first peak detection process executed by the control unit 8. The processes shown in FIGS. 16A and 16B are repeatedly executed by the control unit 8 in predetermined computation cycles.

As shown in FIG. 16A, in the right lane changing first peak detection process, when determining that the steering wheel 3 has been rotated towards the right (step S20: YES) and that the steering wheel 3 has then been rotated towards the left (step S21: YES), the control unit 8 updates various information related to the right lane changing first peak (step S22). In other words, the control unit 8 updates various information related to the first peak when the rotation angle θ of the steering wheel 3 reaches the first peak. The various information related to the first peak is hereinafter referred to as first peak information. The first peak information is stored, for example, in the memory 8a in step S22 and includes the rotation angle θ1R of the steering wheel 3 detected by the rotation angle sensor 5 when step S22 is executed and the present time T1R recognized by the control unit 8. Therefore, the first peak information indicates changes in the turning state of the vehicle.

After the execution of step S22, the control unit 8 determines with the timer 8b whether or not a predetermined time Tb has elapsed (step S23). If the predetermined time Tb has elapsed (step S23: YES), the control unit 8 initializes the first peak information stored in the memory 8a, that is, the rotation angle θ1R and the time T1R (step S24). The predetermined time Tb is set beforehand to a time that is sufficiently longer than the estimated time required for the rotation angle θ of the steering wheel 3 to reach the second peak from the first peak. In step S24, character information "C", which indicates that the first peak information for the right lane change has been initialized, is stored, for example, in a region of the memory 8a for storing the rotation angle θ1R of the memory 8a. After the execution of step S24, the control unit 8 terminates the series of processes.

As shown in FIG. 16B, the left lane changing first peak detection process is executed in substantially the same manner as the right lane changing first peak detection process. However, in the left lane changing first peak detection process, when determining that the steering wheel 3 has been rotated towards the left (step S30: YES) and the steering wheel 3 has then been rotated towards the right (step S31: YES), the control unit 8 updates information for the left lane changing first peak (step S32). Subsequent to step S32, the control unit 8 executes steps S33 and S34, which are substantially the same as steps S23 and S24.

Figure 17:
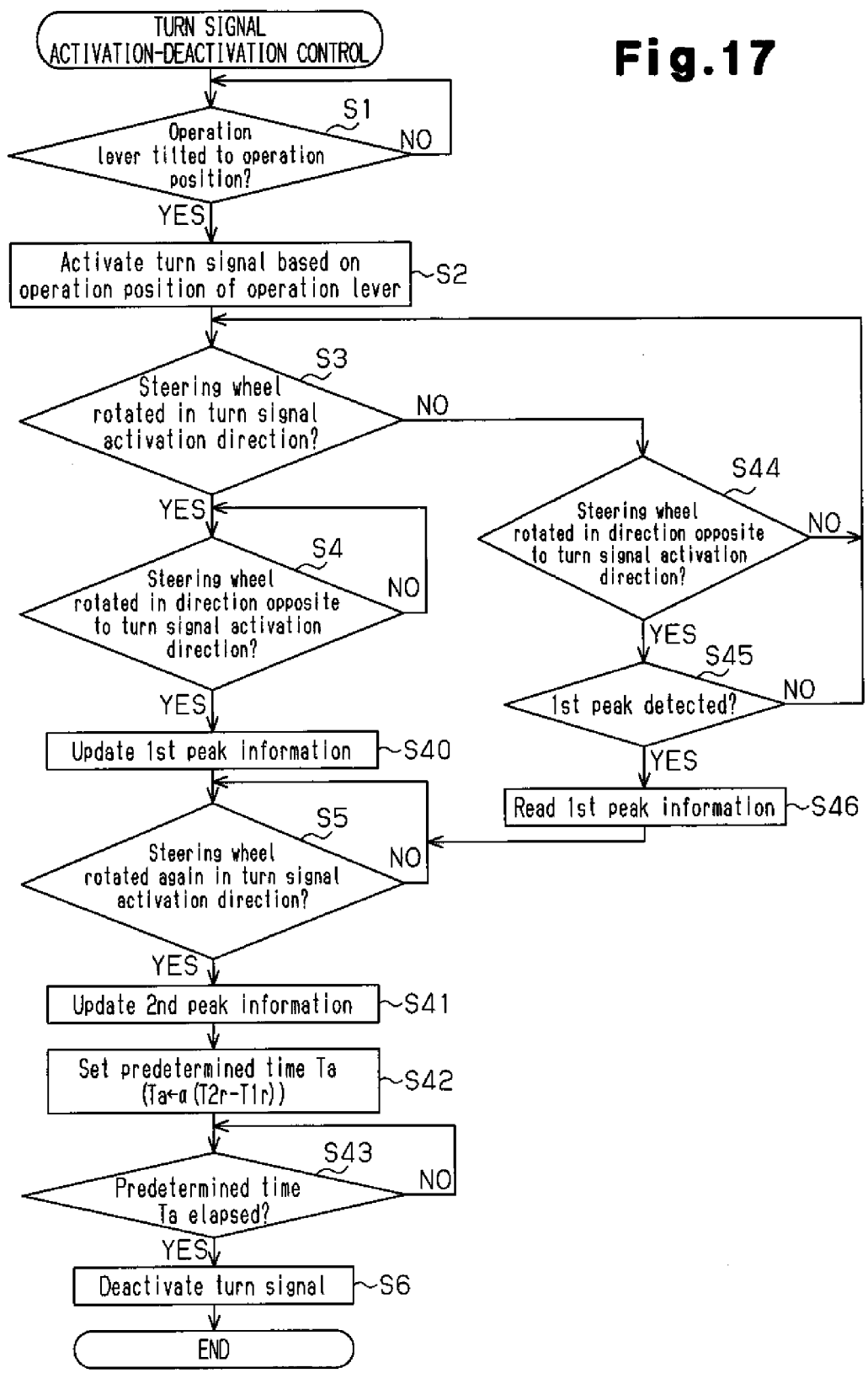
FIG. 17 is a flowchart showing an activation-deactivation control of the fourth embodiment executed by the turn signal device of FIG. 4.

FIG. 17 is a flowchart showing the activation-deactivation control of the turn signals 4a and 4b executed by the control unit 8. The processes shown in FIG. 17 are also repeatedly executed by the control unit 8 in predetermined computation cycles. In this control, substantially the same processes are performed for when the turn signal 4a on the right side of the vehicle is activated and for when the turn signal 4b on the left side of the vehicle is activated. Therefore, only the processes that are performed when the turn signal 4a on the right side of the vehicle is activated will be discussed below for the sake of brevity.

As shown in FIG. 17, when determining that the steering wheel 3 has been rotated in the direction opposite to the activation direction of the turn signal 4a on the right side of the vehicle (step S4: YES), the control unit 8 updates the first peak information (step S40). That is, the first peak information is updated when the rotation angle θ of the steering wheel 3 reaches the first peak. Specifically, in step S40, the control unit 8 stores the present rotation angle θ1R of the steering wheel 3, which is detected by the rotation angle sensor 5, and the current time T1R, which is recognized by the control unit 8, in the memory 8a.

Subsequent to step S40, when determining that the steering wheel 3 has been rotated again in the activation direction of the turn signal 4a (step S5: YES), the control unit 8 updates the second peak information (step S41). That is, the second peak information is updated when the rotation angle θ of the steering wheel 3 reaches the second peak. Specifically, in step S41, the control unit 8 stores the present rotation angle θ2R of the steering wheel 3, which is detected by the rotation angle sensor 5, and the current time T2R, which is recognized by the control unit 8, in the memory 8a. The second peak information is also information that indicates changes in the turning state of the vehicle.

Subsequent to step S41, the control unit 8 subtracts the detection time T1R of the first peak from the detection time T2R of the second peak to obtain the time interval between the two times (T2R−T1R). The control unit 8 integrates a predetermined value α over the time interval (T2R−T1R) to calculate the predetermined time Ta (step S42). The control unit 8 then determines whether or not the predetermined time Ta has elapsed from when the rotation angle θ of the steering wheel 3 reached the second peak (step S43). When the predetermined time Ta elapses (step S43: YES), the control unit 8 deactivates the turn signal (step S6) and terminates the series of processes.

When determining that the steering wheel 3 has not been rotated in the activation direction of the turn signal 4a (step S3: NO), the control unit 8 determines whether or not the steering wheel 3 is being rotated in the direction opposite to the activation direction of the turn signal 4a (step S44). When the steering wheel 3 is rotating in the direction opposite to the activation direction of the turn signal 4a (step S44: YES), the control unit 8 determines whether the first peak of the rotation angle θ of the steering wheel 3 has been detected (step S45). In other words, when it is assumed that the steering wheel 3 has been rotated first in the activation direction of the turn signal 4a and then in the opposite direction, the control unit 8 executes step S45. Specifically, when the value of the rotation angle θ1R of the first peak stored in the memory 8a is a predetermined angle, the control unit 8 determines that the first peak has already been detected. The control unit 8 determines that the first peak has not yet been detected when the character information "C" is set as the value of the rotation angle θ1R of the first peak.

When determining that the first peak has already been detected (step S45: YES), the control unit 8 reads the first peak information, that is, the rotation angle θ1R and the detection time T1R stored in the memory 8a (step S46). The control unit 8 then sequentially executes steps S5 and S41 to calculate the predetermined time Ta based on the detection time T2R of the second peak acquired through step S41 and the detection time T1R of the first peak read in step S46 (step S42).

When determining that the steering wheel 3 is not being rotated in the activation direction of the turn signal 4a (step S44: NO) or when determining that the first peak has not been detected (step S45: NO), the control unit 8 executes step S3.

In the control method of the fourth embodiment, when the driver activates the turn signal 4a on the right side of the vehicle at time t30 as shown in FIG. 15, the control unit 8 determines that the steering wheel 3 is being rotated in the direction opposite to the activation direction of the turn signal 4a at time t30. The control unit 8 determines, based on the first peak information stored in the memory 8a, that the first peak of the rotation angle θ of the steering wheel 3 has already been detected and then reads the first peak information. At time t24, when the driver rotates the steering wheel 3 in the reverse direction for the second time, the control unit 8 determines the peak of the rotation angle θ of the steering wheel 3 as being the second peak and calculates the predetermined time Ta. Then, the control unit 8 deactivates the turn signal 4a on the right side of the vehicle at time t31, which is when the predetermined time Ta elapses from time t24. Therefore, the turn signal 4a on the right side of the vehicle is deactivated when the vehicle is entering the right lane LR and substantially completes lane changing.

The predetermined time Ta changes in accordance with the time (T2R−T1R) required for the vehicle to enter a different lane from when the vehicle starts changing lanes. Thus, the predetermined time Ta changes depending on whether the vehicle is quickly changing lanes or slowly changing lanes. That is, the predetermined time Ta is set in accordance with the operation state of the vehicle when changing lanes. As a result, the determination of whether the vehicle has completed lane changing is performed further appropriately.

The turn signal device of the fourth embodiment has the advantages described below in addition to advantage (2) of the first embodiment and advantage (3) of the second embodiment.

(5) The control unit 8 constantly monitors the first peak of the rotation angle θ of the steering wheel 3. When the steering wheel 3 is rotating in the direction opposite to the activation direction of the turn signal 4a or 4b upon activation of the turn signal 4a or 4b, the control unit 8 determines the first peak of the rotation angle θ obtained before activating the turn signal 4a or 4b based on the first peak information, which is constantly monitored by the control unit 8. Therefore, the turn signal 4a or 4b is deactivated when the vehicle is entering a different lane even when the driver activates the turn signal 4a or 4b after the rotation angle θ of the steering wheel 3 reaches the first peak. In other words, the turn signals 4a or 4b is deactivated when the vehicle is entering a different lane even when the driver activates the turn signal 4a or 4b after the vehicle starts to turn in the direction opposite to the activation direction of the turn signal 4a or 4b. Accordingly, the turn signal 4a or 4b is deactivated in further correspondence with the actual situation. This further ensures the reliability of the deactivation function of the turn signals 4a and 4b.

(6) The predetermined time Ta from when the rotation angle θ of the steering wheel 3 reaches the second peak to when the turn signal 4a or 4b is deactivated is set based on the time interval of the detection time of the first peak and the detection time of the second peak. That is, the predetermined time Ta is set in accordance with the speed at which the driver operates the steering wheel 3. Thus, the determination of whether or not the vehicle has completed lane changing is performed further appropriately.

It should be apparent to those skilled in the art that the present invention may be embodied in many other specific forms without departing from the spirit or scope of the invention. Particularly, it should be understood that the present invention may be embodied in the following forms.

An inflection point of the rotation angle θ may be detected based on a temporal change in the rotation angle θ detected by the rotation angle sensor 5. The inflection point corresponds to the value of the rotation angle θ (i.e., 0° when the rotation angle θ changes from a negative value to a positive value (or from a positive value to a negative value) and is detected at, for example, time t23 in FIG. 15. In the deactivation control of FIGS. 10 and 17, the inflection point may be detected to set the predetermined time Ta. For instance, in FIG. 15, the predetermined time Ta may be set based on the time interval from time t23, which is when the inflection point of the rotation angle θ is detected, to time t24, which is when the second peak of the rotation angle θ is detected. In the control shown in FIGS. 10 and 17, the predetermined time Ta may be set based on the time interval from when determined that the steering wheel 3 is being rotated in the activation direction of the turn signal in step S3 (i.e., when starting lane changing) to when determined that the steering wheel 3 is being rotated again in the activation direction of the turn signal in step S5 (i.e., when detecting the second peak). Further, in the control shown in FIGS. 10 and 17, the predetermined time Ta may be set based on the time interval from when the turn signal 4a or 4b is activated in correspondence with the operation position of the operation lever 2 in step S2 to when the second peak of the rotation angle θ of the steering wheel 3 is detected in step S5. Such configurations obtain the same advantage as advantage (6) of the fourth embodiment.

In the third embodiment, the turning speed of the vehicle is determined by detecting the rotation speed ω of the steering wheel 3 based on the present rotation angle θ of the steering wheel 3, which is detected by the rotation angle sensor 5 and the rotation angle θ, which has been detected a predetermined period before the present time and stored in the memory 8a. In other words, the rotation angle sensor 5 serves as a turning speed detection unit for detecting the turning speed of the vehicle. In lieu of the rotation angle sensor 5, a yaw rate sensor (yaw rate detection unit), which detects the yaw rate of the vehicle, may be used as the turning speed detection unit. In this case, the turning speed of the vehicle may be directly detected based on the yaw rate of the vehicle, which is detected by the yaw rate sensor.

In the modification of the second embodiment and in the third embodiment, the turning change amount of the vehicle is determined by calculating the amount of change in the rotation angle θ based on the rotation angle θ of the steering wheel 3, which is detected by the rotation angle sensor 5. In other words, the rotation angle sensor 5 serves as a turning amount detection unit for detecting the turning amount of the vehicle. Instead, the yaw rate sensor (yaw rate detection unit) described above may be used as the turning amount detection unit. In this case, the turning amount of the vehicle is calculated based on the yaw rate of the vehicle, which is detected by the yaw rate sensor.

In each of the embodiments and their modifications described above, the operation lever 2 is a so-called momentary type in which the operation lever 2 automatically returns to the neutral position PC from its tilted operation position PR or PL when external force is removed. Instead, the operation lever 2 may be held at the tilted position when tilted to each of the operation positions PR and PL. In this case, a return mechanism 6 is used to return the operation lever 2 from the operation position PR or PL to the neutral position PC. When using the return mechanism 6, the return mechanism 6 is driven to return the operation lever 2 to the neutral position PC when the turn signal 4a or 4b is deactivated in step S6, which is described above and shown in FIG. 7.

In each of the embodiments and their modifications described above, a temporal change in the turning state of the vehicle is determined based on the rotation angle θ of the steering wheel 3, which is detected by the rotation angle sensor 5. In other words, the rotation angle sensor 5 is arranged as a turning state detection unit for detecting the turning state of the vehicle. In lieu of the rotation angle sensor 5, a yaw rate sensor (yaw rate detection unit), which detects the yaw rate of the vehicle, may be used as the turning state detection unit. In other words, the turning state detection unit may be formed by a yaw rate sensor (yaw rate detection unit) and the control unit 8. In this case, the yaw rate sensor generates a voltage signal indicating the yaw rate of the vehicle (or angular speed obtained from the voltage signal), and the control unit 8 detects a temporal change in the turning state of the vehicle based on the voltage signal (or angular speed). A change in the yaw rate of the vehicle is analogous to a change in the rotation angle of the steering wheel, and the changing behavior of the yaw rate and the rotation angle is generally correlated. Thus, in each of the embodiments and their modifications described above, the rotation direction of the steering wheel 3 is determined based on the difference value of the present rotation angle $\theta_n$ of the steering wheel 3 detected by the rotation angle sensor 5 and the preceding rotation angle $\theta_{n-1}$ detected by the sensor 5. However, the rotation direction of the steering wheel 3 may be determined by detecting changes in the voltage signal (or angular speed obtained from the voltage signal) output from the yaw rate sensor. In other words, a temporal change in the turning state of the vehicle may be determined by detecting a temporal change in the yaw rate of the vehicle. Thus, by executing the same control as that shown in FIG. 7 based on the voltage signal (or angular speed) output from the yaw rate sensor, the advantages (1), and (3) to (6) of each embodiment may be obtained.

In each embodiment and the modification thereof, the first and second peaks of the rotation angle $\theta$ of the steering wheel 3 are detected based on the temporal change in the rotation direction of the steering wheel 3. In place thereof, the first and second peaks of the rotation angle $\theta$ may be detected by detecting the maximum value and the minimum value from the temporal change in the rotation angle $\theta$ detected by the rotation angle sensor 5.

The present examples and embodiments are to be considered as illustrative and not restrictive, and the invention is not to be limited to the details given herein, but may be modified within the scope and equivalence of the appended claims.

We claim:

1. A turn signal device for a vehicle for activating a turn signal in accordance with operation of an operation lever, the turn signal device comprising:
   a turning state detection unit which detects a turning state of the vehicle, the turning state detection unit monitoring temporal change in the turning state of the vehicle after the turn signal is activated, so that the turning state detection unit deactivates the turn signal when detecting that the vehicle first turns in an activation direction of the turn signal, then turns in a direction opposite to the activation direction, and afterward turns again in the activation direction before the vehicle returns back to a straight ahead state, wherein the turning state detection unit allows the turn signal to be deactivated even before the vehicle returns back to the straight ahead state.

2. The turn signal device according to claim 1, wherein the turning state detection unit constantly monitors temporal change in the turning state of the vehicle, and the turning state detection unit determines, based on information indicating change in the constantly monitored turning state of the vehicle, that the vehicle turned in the direction opposite to the activation direction of the turn signal after being first turned in the activation direction when detecting upon activation of the turn signal that the vehicle is being turned in the direction opposite to the activation direction of the turn signal.

3. The turn signal device according to claim 1, wherein the turning state detection unit deactivates the turn signal when determining that the vehicle has completed lane changing after being turned again in the activation direction of the turn signal.

4. The turn signal device according to claim 3, further comprising:
   a timer circuit which measures elapsed time from when the vehicle turns again in the activation direction of the turn signal;
   wherein the turning state detection unit determines that the vehicle has completed lane changing when the elapsed time measured by the timer circuit reaches a predetermined time.

5. The turn signal device according to claim 4, wherein the predetermined time is set based on a time interval from when the vehicle turns in the direction opposite to the activation direction after being first turned in the activation direction of the turn signal to when the vehicle turns again in the activation direction of the turn signal.

6. The turn signal device according to claim 4, wherein the predetermined time is set based on a time interval from when the turn signal is activated to when the vehicle turns again in the activation direction of the turn signal.

7. The turn signal device according to claim 4, wherein the predetermined time is set based on a time interval from when the vehicle first turns in the activation direction of the turn signal to when the vehicle turns again in the activation direction of the turn signal.

8. The turn signal device according to claim 4, further comprising:
   a rotation angle detection unit which detects a rotation angle of a steering wheel of the vehicle;
   wherein the turning state detection unit detects with the rotation angle detection unit a first peak in temporal change of the rotation angle after activation of the turn signal, an inflection point of the rotation angle after detection of the first peak, and a second peak in the temporal change of the rotation angle after detection of the inflection point; and
   the predetermined time is set based on a time interval from when the inflection point is detected to when the second peak is detected.

9. The turn signal device according to claim 3, further comprising:
   a turning amount detection unit which detects a turning amount of the vehicle;
   wherein the turning state detection unit detects with the turning amount detection unit the turning amount of the vehicle from when the vehicle turns again in the activation direction of the turn signal, and the turning state detection unit determines that the vehicle has completed lane changing when the detected turning amount reaches a predetermined amount.

10. The turn signal device according to claim 9, further comprising:
    a turning speed detection unit which detects turning speed of the vehicle;
    wherein the turning state detection unit determines that the vehicle has completed lane changing when the turning speed of the vehicle becomes less than or equal to a predetermined speed during a period from when the vehicle turns again in the activation direction of the turn signal to when the turning amount of the vehicle reaches the predetermined amount.

11. The turn signal device according to claim 1, wherein the turning state detection unit includes a rotation angle detection unit which detects rotation angle of a steering wheel of the vehicle, the turning state detection unit detects temporal change in the turning state of the vehicle by detecting temporal change in the rotation angle with the rotation angle detection unit, and the turning state detection unit detects that the vehicle first turns in the activation direction of the turn signal, then turns in the direction opposite to the activation direction, and afterward turns again in the activation direction based on two peaks in the temporal change of the rotation angle produced after the turn signal is activated.

12. The turn signal device according to claim 11, wherein the turning state detection unit detects a first peak of the rotation angle, which is produced when the vehicle turns in the activation direction of the turn signal, and a second peak of the rotation angle, which is produced when the vehicle turns in the direction opposite to the activation direction, and the turning state detection unit deactivates the turn signal based on the detection of the first and second peaks.

13. The turn signal device according to claim 1, wherein the turning state detection unit includes a yaw rate detection unit which detecting a yaw rate of the vehicle, and the turning state detection unit detects temporal change in the turning state of the vehicle by detecting temporal change in the yaw rate with the yaw rate detection unit, and the turning state detection unit detects that the vehicle first turns in the activation direction of the turn signal, then turns in the direction opposite to the activation direction, and afterward turns again in the activation direction based on two peaks in the temporal change of the yaw rate of the vehicle produced after the turn signal is activated.

14. The turn signal device according to claim 13, wherein the turning state detection unit detects a first peak of the yaw rate, which is produced when the vehicle turns in the activation direction of the turn signal, and a second peak of the yaw rate, which is produced when the vehicle turns in the direction opposite to the activation direction, and the turning state detection unit deactivates the turn signal based on the detection of the first and second peaks.

* * * * *